United States Patent [19]

Stritzke et al.

[11] Patent Number: 4,799,691
[45] Date of Patent: Jan. 24, 1989

[54] REAR CRANKSHAFT SEAL HOUSING WITH INTEGRALLY BONDED SEAL

[75] Inventors: Bernard G. Stritzke, Hanover Park; Brian F. Rericha, Downers Grove, both of Ill.

[73] Assignee: Microdot Inc., Darien, Conn.

[21] Appl. No.: 158,395

[22] Filed: Feb. 22, 1988

[51] Int. Cl.⁴ .............................................. F16J 15/10
[52] U.S. Cl. ........................................ 277/12; 277/152; 277/189; 277/DIG. 4; 123/198 E; 411/969
[58] Field of Search ................... 277/152, 153, 12, 32, 277/165, 105, 178, 181–184, 188 R, 189, 215, DIG. 4; 123/198 R, 198 E; 411/177, 180, 969

[56] References Cited

U.S. PATENT DOCUMENTS

| | | |
|---|---|---|
| 2,639,832 | 5/1953 | Bergstrom .................. 277/189 X |
| 2,745,521 | 5/1956 | White ............................ 277/189 |
| 3,087,734 | 4/1963 | Klingler .................. 277/DIG. 4 X |
| 4,227,704 | 10/1980 | Blaha ........................ 277/189 X |
| 4,418,922 | 12/1983 | Janzito ......................... 277/152 |
| 4,484,751 | 11/1984 | Deuring ..................... 277/153 X |
| 4,643,439 | 2/1987 | Lewis et al. .............. 277/152 X |
| 4,730,836 | 3/1988 | Miller et al. ............ 123/198 E X |

Primary Examiner—Harvey C. Hornsby
Assistant Examiner—Stephen F. Gerrity
Attorney, Agent, or Firm—Lyman R. Lyon

[57] ABSTRACT

A plastic seal housing with an integrally bonded elastomeric seal for use about the rear crankshaft of an internal combustion engine featuring fewer leak paths and requiring no secondary machining of the seal housing subsequent to the molding thereof.

4 Claims, 1 Drawing Sheet

REAR CRANKSHAFT SEAL HOUSING WITH INTEGRALLY BONDED SEAL

BACKGROUND OF THE INVENTION

The invention relates to rotary shaft seals, such as those utilized in an internal combustion engine to seal the aperture through which the rear portion of its crankshaft projects.

The prior art teaches the use of an annular aluminum seal housing having a machined bore wherein a molded shaft seal is secured as by press fitting. The resultant seal assembly generates three potential leak paths: the first, between the shaft and the sealing element; the second, between the sealing element and the housing; and the third, between the housing and the engine block/oil pan.

An aluminum rear crankshaft seal housing as taught by the prior art is additionally provided with tapped bores within the plane perpendicular to the main shaft bore for receipt of the engine's oil pan bolts, thereby requiring a costly seondary machining operation.

SUMMARY OF THE INVENTION

The seal housing with integrally bonded seal of the instant invention comprises an annular seal housing having an internal perforated flange to which an annular sealing element is molded. The perforations in the flange act to mechanically bond the sealing element to the flange, as well as functioning as a flow path for the elastic material comprising the sealing element during the molding of the sealing element thereabout. The positive seal thus formed between the housing and sealing element results in the elimination of the leak path therebetween typically found in the prior art.

Where desired, the housing is additionally provided with radially outwardly extending projections having receptacles formed therein suitably configured to retain threaded nuts in alignment with bores extending transversely therethrough in the plane normal to the longitudinal axis of the main shaft bore, thereby obviating the need to tap the transverse bores for receipt of bolts advanced therethrough.

It is noted that material of the seal housing of the instant invention comprises either metal, such as aluminum, or plastic. It will be appreciated that, as a plastic seal housing is readily molded with an excellent surface finish thereupon and precisely-defined bores and apertures therein, subsequent machining operations are not required, and a substantial reduction in manufacturing cost is achieved.

DETAILED DESCRIPTION OF THE PREFERRED EMBODIMENT OF THE INVENTION

Figure 1:
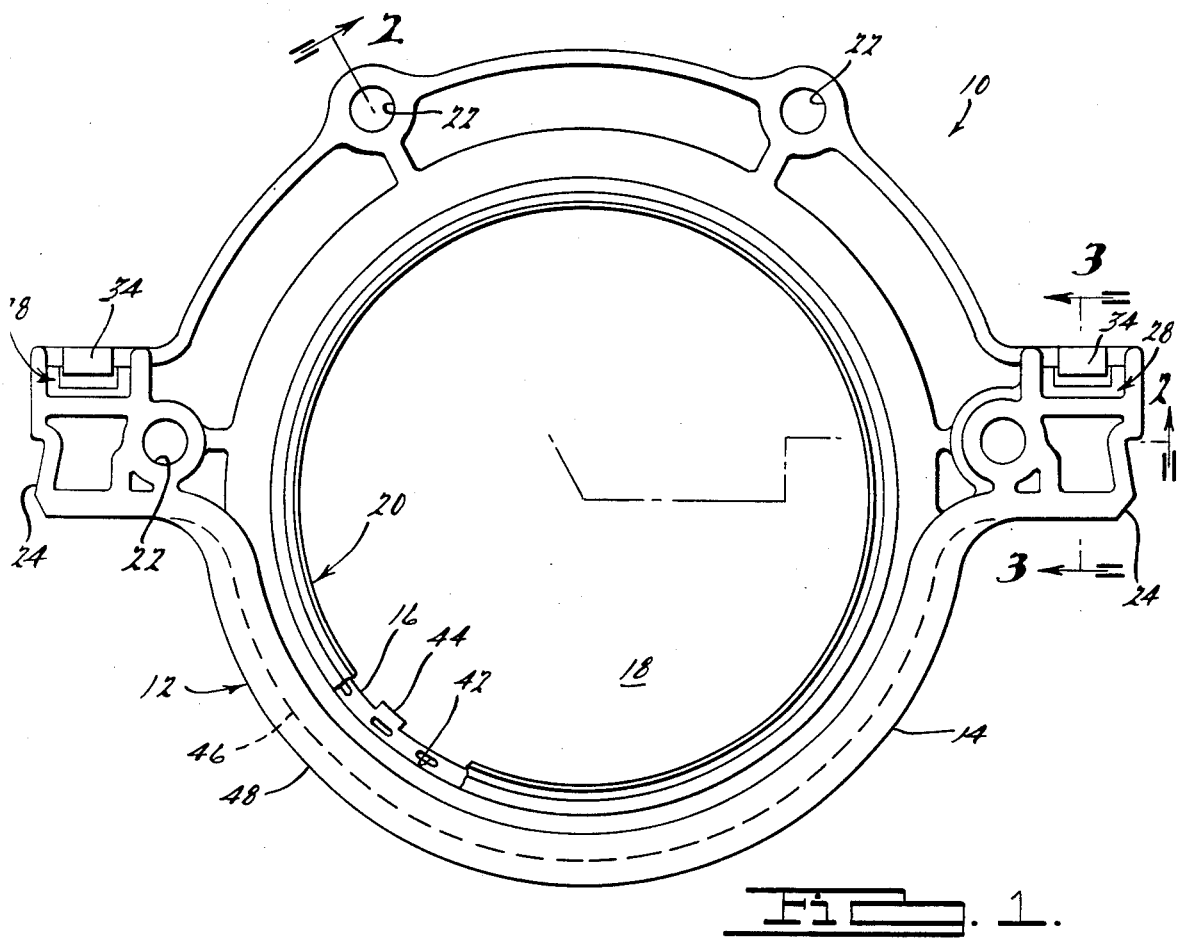
FIG. 1 is an end view of a rear crankshaft seal housing with integrally bonded seal constructed in accordance with the instant invention.

Referring to FIG. 1, a rear crankshaft seal housing with integrally bonded seal 10 constructed in accordance with the instant invention comprises a plastic housing 12 having an annular body portion 14 with an internal flange 16 extending radially inwardly therefrom to define a central longitudinal circular aperture 18; and an annular elastic sealing element 20 molded to the internal flange 16 in the manner described hereinbelow.

The housing body 14 has a plurality of mounting bores 22 extending longitudinally therethrough circumferentially spaced about a portion of its periphery. The bores 22 permit the housing 12 to be fixedly attached to the engine block (not shown) by means of conventional threaded fasteners (not shown) engageable with a complementary array of tapped mounting holes formed in the engine block.

Figure 2:
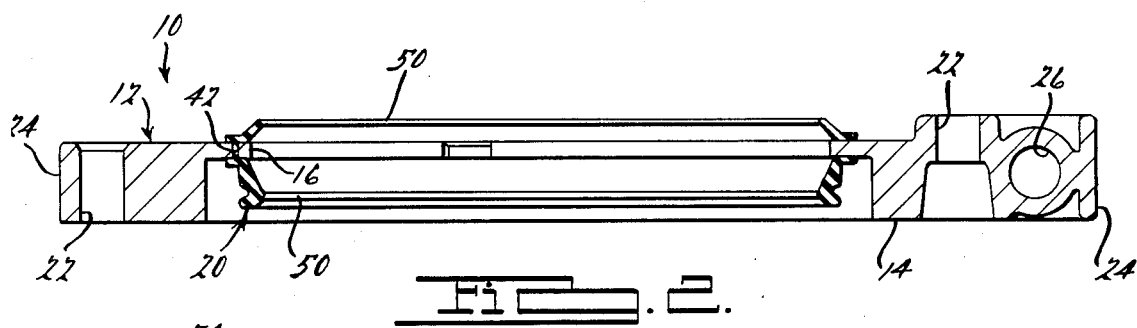
FIG. 2 is a view in cross-section of the housing and sealing element along line 2—2 of FIG. 1.
Figure 3:
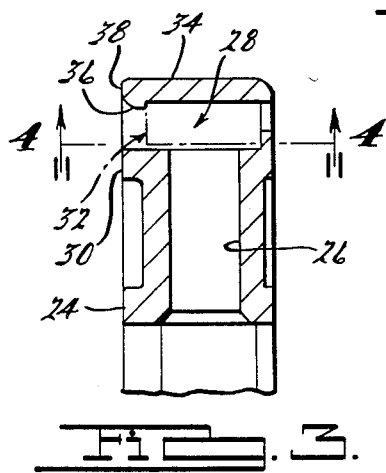
FIG. 3 is a fragmented view in cross-section along line 3—3 of FIG. 1 of a transverse bore with threaded nut wherein an oil pan bolt is received.
Figure 4:
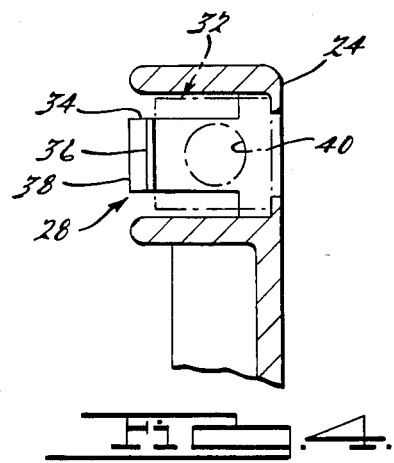
FIG. 4 is a fragmented view in cross-section of the transverse bore with threaded nut along line 4-4 of FIG. 3.

The housing 12 is further provided with a pair of diametrically opposed projections 24 extending radially outwardly from the body portion 14 thereof in the plane normal to the longitudinal axis of central aperture 18. Each projection 24 is in turn provided with a bore 26 extending transversely thereof within a plane normal to the longitudinal axis of the central aperture 18 of the housing 12, and a cavity 28 extending normally of the transverse bore 26 from the outer surface 30 of the housing 12 and intersecting therewith, as illustrated in FIGS. 2–4. A female fastener element, such as threaded nut 32, is situated within each cavity 28, whereby a male fastener element, such as an oil pan bolt (not shown), advanced into each projection 24 through transverse bore 26 thereof is secured relative thereto by nut 32.

A cantilevered beam 34 having a barb 36 situated on the free end 38 thereof extends transversely of transverse bore 26, as shown in FIGS. 3 and 4. The cantilevered beam 34 is resiliently yieldable axially of the transverse bore 26 during insertion of the nut 32 into cavity 28, whereafter the barb 36 engages with the nut 32 to retain it within cavity 38 and maintain its central aperture 40 in alignment with transverse bore 26.

A plurality of circumferentially-spaced minute apertures or perforations 42 are formed in the internal flange of housing 12 so as to extend longitudinally therethrough. The perforations 42 act to mechanically bond the elastic sealing element 20 to the internal flange 16 of the housing body 14, as well as providing a flow path encouraging proper sealing element formation during the molding thereof about internal flange 16. Additionally, the internal flange 16 is provided with a plurality of radially inwardly extending tangs 44 which act to center the housing 12 about a crankshaft (not]shown) extending therethrough during the installation thereof, whereby concentricity of the seal housing, sealing element, and crankshaft is ensured.

A trough 46 is formed in a portion 48 of the periphery of the housing 12 so as to essentially extend between the projections 24 thereon, wherein an oil pan seal (not shown) is seated upon assembly of the housing 12 therewith.

The annular sealing element 20 is molded to the internal flange 16 in a manner known to those skilled in the art. During the molding of sealing element 20, a portion of the elastic material thereof flows through the perforations 42 in internal flange 16, whereby the sealing element 20 is mechanically bonded thereto. The sealing element 20 is typically provided with a plurality of axially and radially inwardly extending sealing lips 50, as seen in FIG. 2, for maintaining sealing contact with the crankshaft extending therethrough.

While the preferred embodiment of the invention has been disclosed, it should be appreciated that the invention is susceptible of modification without departing from the spirit of the invention or the scope of the subjoined claims.

We claim:

1. A seal housing with integrally bonded seal comprising a seal housing comprising an annular body portion having an internal radially inwardly extending perforated flange defining a central longitudinal circular aperture; a plurality of bores extending longitudinally through said body portion; and a pair of diametrically opposed projections extending radially outwardly from said body portion, each of said projections having a bore extending transversely thereof within a plane normal to the longitudinal axis of the central aperture of said housing and having a cavity extending normally of the transverse bore and intersecting therewith;

an annular sealing element formed of an elastic material molded to the internal flange of said housing, said elastic material flowing through the perforations in the internal flange during such molding, whereby said sealing element is mechanically bonded to said housing; and a female fastener element situated within each of the cavities of the projections of said housing, whereby a male fastener element advanced through the transverse bore of each projection is secured relative thereto by said female fastener element.

2. The seal housing with integrally bonded seal of claim 1 including means in the cavities of said housing for retaining said female fastener elements therein, whereby said female fastener elements are maintained in alignment with the transverse bores of the projections of said housing.

3. The seal housing with integrally bonded seal of claim 2 wherein said means for retaining said female fastener elements in the cavities of said housing comprises a cantilevered beam extending transversely of each of the transverse bores, each of said cantilevered beams having a barb situated on the free end thereof and being resiliently yieldable axially of the transverse bore during insertion of one of said female threaded fasteners into the cavity, with the barb of the cantilevered beam engaging with said female threaded fastener subsequent to such insertion, whereby said female threaded fastener is retained in the cavity.

4. The seal housing with integrally bonded seal of claim 3 wherein said seal housing comprises molded plastic.

* * * * *